(12) United States Patent
Bhatia et al.

(10) Patent No.: US 8,819,292 B2
(45) Date of Patent: Aug. 26, 2014

(54) MULTISIDED AUDIENCE-RELATED HYBRID MEASUREMENTS

(71) Applicant: Yahoo! Inc., Sunnyvale, CA (US)

(72) Inventors: Tarun Bhatia, Thousand Oaks, CA (US); Ayman Farahat, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/016,927

(22) Filed: Sep. 3, 2013

(65) Prior Publication Data

US 2014/0006105 A1  Jan. 2, 2014

Related U.S. Application Data

(63) Continuation of application No. 12/900,366, filed on Oct. 7, 2010, now Pat. No. 8,549,103.

(51) Int. Cl.
*G06Q 30/02* (2012.01)
*G06F 15/16* (2006.01)

(52) U.S. Cl.
USPC ........... 709/247; 709/217; 709/213; 709/230; 709/223; 709/249; 707/797; 707/802; 707/803; 707/804; 370/503

(58) Field of Classification Search
CPC ..................................................... G06Q 30/02
USPC .......... 709/247, 217, 213, 230, 223, 249, 248
See application file for complete search history.

(56) References Cited

U.S. PATENT DOCUMENTS

| | | | |
|---|---|---|---|
| 8,514,210 B2 * | 8/2013 | Roberts et al. | 345/207 |
| 8,549,103 B2 * | 10/2013 | Bhatia et al. | 709/217 |
| 2004/0007121 A1 * | 1/2004 | Graves et al. | 89/1.11 |
| 2006/0230118 A1 * | 10/2006 | Jwo | 709/213 |
| 2007/0038516 A1 | 2/2007 | Apple et al. | |
| 2007/0106674 A1 * | 5/2007 | Agrawal et al. | 707/10 |
| 2008/0288889 A1 * | 11/2008 | Hunt et al. | 715/810 |
| 2008/0294996 A1 * | 11/2008 | Hunt et al. | 715/739 |
| 2008/0319829 A1 * | 12/2008 | Hunt et al. | 705/10 |
| 2009/0006156 A1 * | 1/2009 | Hunt et al. | 705/7 |
| 2009/0018996 A1 * | 1/2009 | Hunt et al. | 707/2 |
| 2009/0328089 A1 * | 12/2009 | Pradeep et al. | 725/12 |
| 2010/0076814 A1 | 3/2010 | Manning | |
| 2010/0228677 A1 | 9/2010 | Houston | |

* cited by examiner

*Primary Examiner* — Jude Jean Gilles (74) *Attorney, Agent, or Firm* — Mauriel Kapouytian Woods LLP (57) ABSTRACT

The present invention provides techniques for use in audience-related measurements, including hybrid techniques which include use of panel-based audience-related measurement information and census-based audience-related measurement information. Techniques are provided in which panel-based audience-related measurement information is obtained from multiple providing entities, and census-based audience-related measurement information is obtained one or more providing entities. The obtained information is stored in a database. The stored information may be provided to the information-providing entities, and may be used in calibrating or improving the accuracy of audience-related measurements.

20 Claims, 5 Drawing Sheets

MULTISIDED AUDIENCE-RELATED HYBRID MEASUREMENTS

PRIORITY APPLICATION

The present application claims, under 35 U.S.C. 120, benefit and priority to and is a continuation of U.S. patent application Ser. No. 12/900,366, filed Oct. 7, 2010, and entitled "Multisided Audience-Related Hybrid Measurements," by inventors Tarun Bhatia and Ayman Farahat, which is expressly incorporated herein by reference.

BACKGROUND

Measurements and metrics associated with online audiences, including exposure and advertising-related metrics, such as unique users, page views, an advertisement views, may be useful or needed, directly or indirectly, in various ways and by various parties, including measurement vendors and customers, advertisers, publishers, and advertising marketplace providers.

Census-based measurement techniques are very useful, but have limitations. For example, census-based measurements may be advantageous in that they have broad or full access to an entire network or other group of users served. However, census-based online audience measurements based on parameters such as cookies may be problematic in that it may not be possible through the network to determine, or determine accurately, the number of unique users represented by the cookie-based metrics.

Panel-based measurements may be derived from one or more panels of users, where a panel may be a subset of users that provide a source for observations that can be used to estimate parameters relating to a larger population, such as an online network-based audience. Panel-based measurements, while they may be accurate as to the subset of users, and a useful and important source for extrapolation and estimation, may suffer from issues or deficiencies such as a lack of alignment with the population being projected, such as when a panel, or its behavior, is not accurately representative or reflective of the larger projected population.

Given the above advantages and deficiencies, hybrid measurement techniques are increasingly emerging as a way to achieve better performance than panel-based measurement techniques alone or census-based measurement techniques alone, where a hybrid measurement technique may utilize aspects of or information derived from both panel-based and census-based measurement techniques.

However, hybrid techniques may have insufficiently limited, biased, or poorly calibrated information, leading to less than ideal associated hybrid technique performance or accuracy.

There is a need for improved hybrid audience-related measurement techniques.

SUMMARY

Some embodiments of the invention provide techniques for use in audience-related measurements, including hybrid techniques which include use of panel-based audience-related measurement information and census-based audience-related measurement information. Techniques are provided in which panel-based audience-related measurement information is obtained from multiple providing entities, and census-based audience-related measurement information is obtained from one or more providing entities. The obtained information is stored in a database. The stored information may be provided to information-providing entities, and may be used in calibrating or improving the accuracy of audience-related measurements.

While the invention is described with reference to the above drawings, the drawings are intended to be illustrative, and the invention contemplates other embodiments within the spirit of the invention.

DETAILED DESCRIPTION

Figure 1:
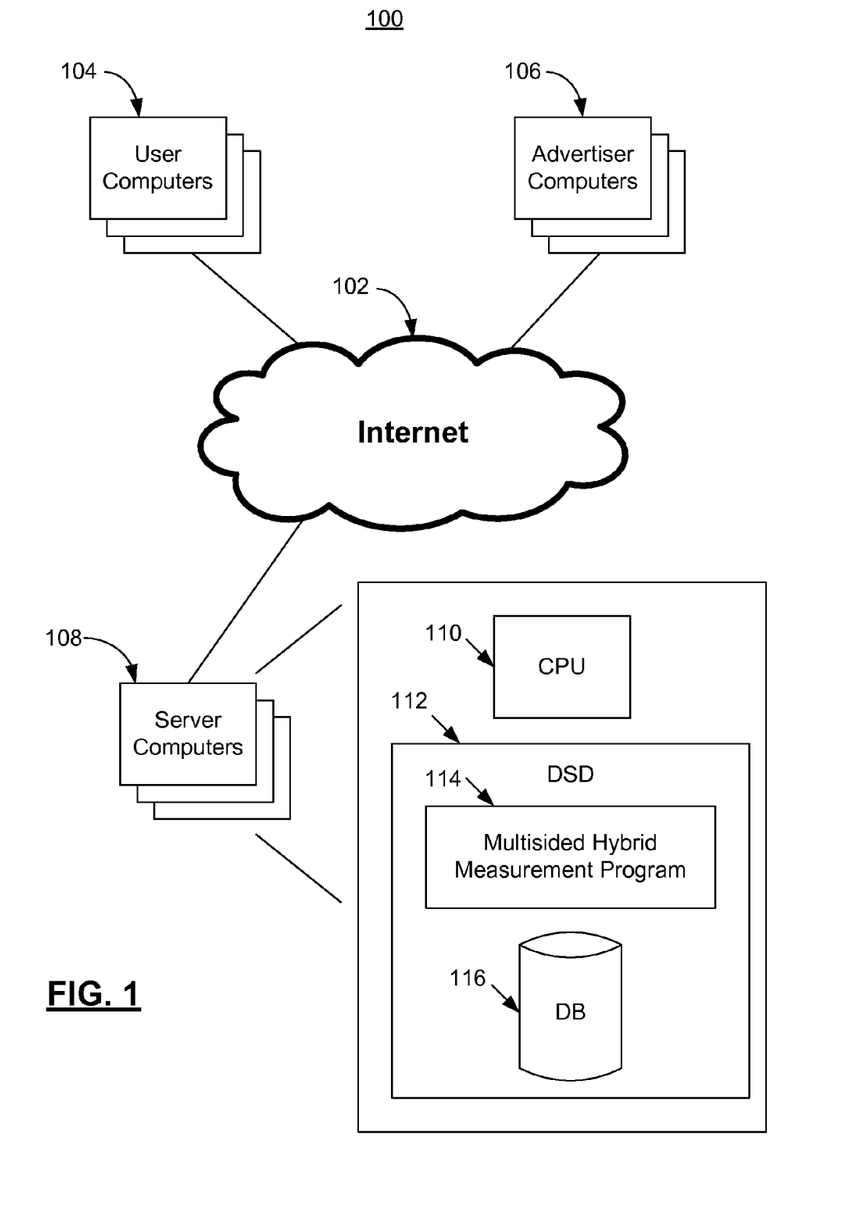
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Multisided Hybrid Measurement Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Various monetization techniques or models may be used in connection with advertising, such as sponsored search advertising, including advertising associated with user search queries, and non-sponsored search advertising, including graphical or display advertising. In an auction-based online advertising marketplace, advertisers may bid in connection with placement of advertisements, although many other factors may also be included in determining advertisement selection or ranking. Bids may be associated with amounts the advertisers pay for certain specified occurrences, such as for placed or clicked-on advertisements, for example.

Advertiser payment for online advertising may be divided between parties including one or more publishers or publisher networks, and one or more marketplace facilitators or providers, potentially among other parties. Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics. In some embodiments of the invention, payment may be based on assessed favorable branding or brand engagement value, for example.

Figure 2:
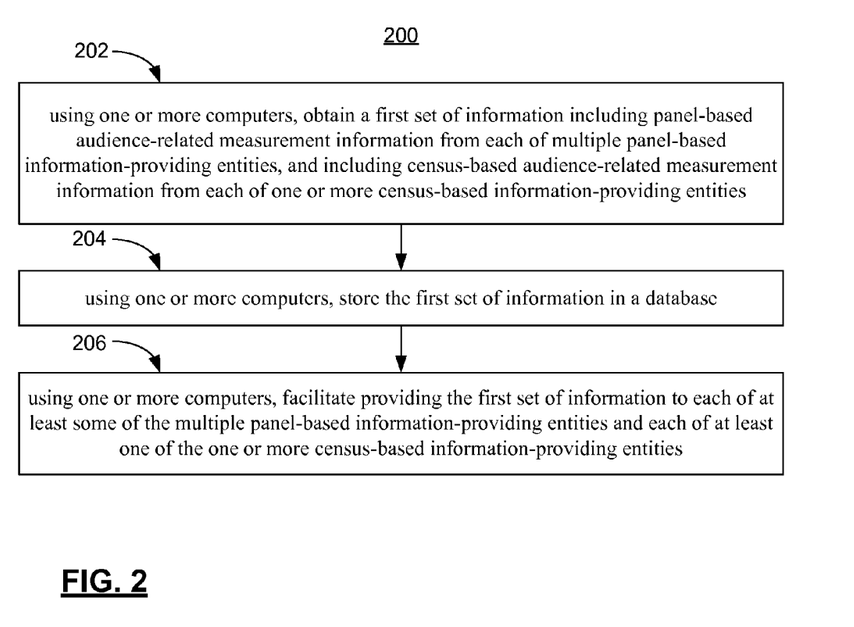
FIG. 2 is a flow diagram illustrating a method according to one embodiment of the invention.

FIG. 2 is a flow diagram illustrating a method 200 according to one embodiment of the invention. At step 202, using one or more computers, a first set of information is obtained, including panel-based audience-related measurement information from each of multiple panel-based information-providing entities, and including census-based audience-related measurement information from each of one or more census-based information-providing entities.

At step 204, using one or more computers, the first set of information is stored in a database.

At step 206, using one or more computers, the method 200 includes facilitating providing the first set of information to each of at least some of the multiple panel-based information-providing entities and each of at least one of the one or more census-based information-providing entities.

Figure 3:
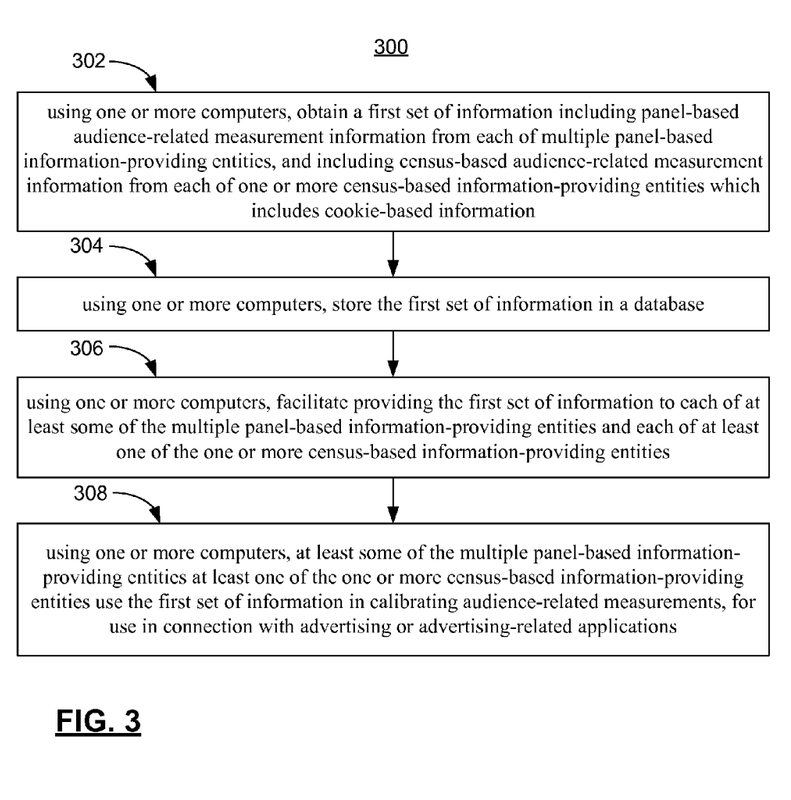
FIG. 3 is a flow diagram illustrating a method according to one embodiment of the invention.

FIG. 3 is a flow diagram illustrating a method 300 according to one embodiment of the invention. At step 302, using one or more computers, a first set of information is obtained, including panel-based audience-related measurement information from each of multiple panel-based information-providing entities, and including census-based audience-related measurement information from each of multiple census-based information-providing entities which includes cookie-based information.

At step 304, using one or more computers, the first set of information is stored in a database.

At step 306, using one or more computers, the method 300 includes facilitating providing the first set of information to each of at least some of the multiple panel-based information-providing entities and each of at least some of the multiple census-based information-providing entities, for use in connection with advertising or advertising-related applications.

At step 308, using one or more computers, at least some of the multiple panel-based information-providing entities at least some of the multiple census-based information-providing entities use the first set of information in calibrating audience-related measurements.

Figure 4:
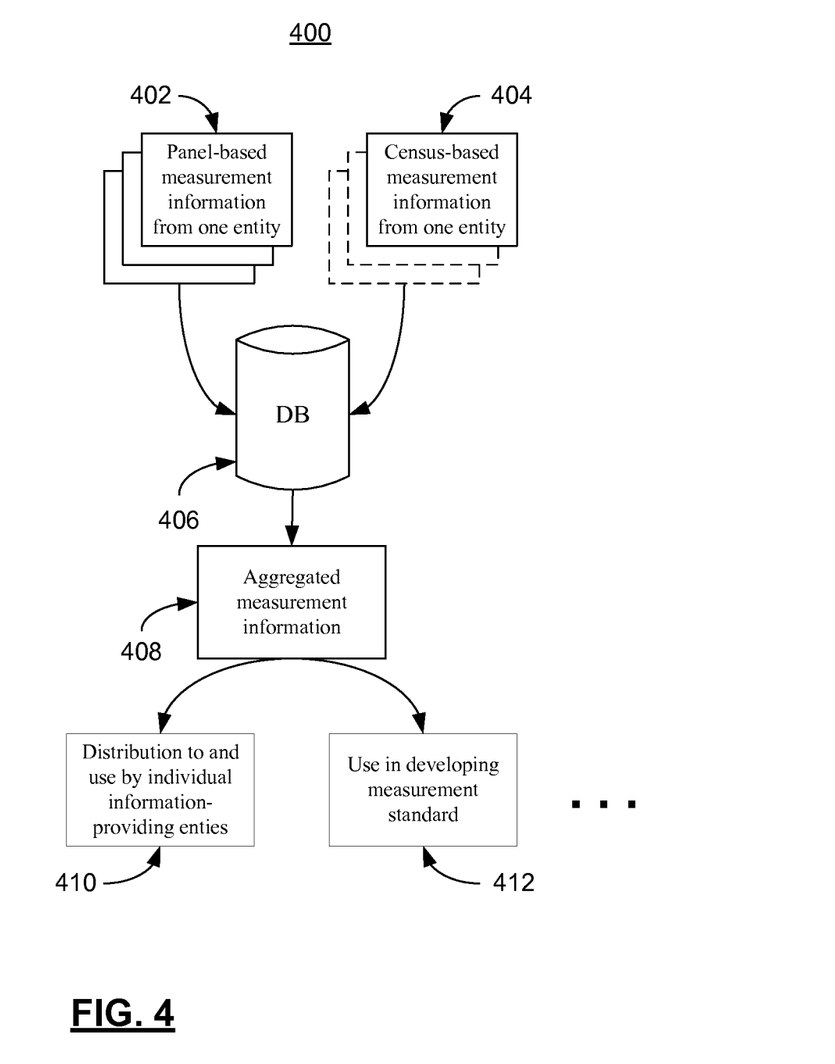
FIG. 4 is a block diagram illustrating one embodiment of the invention.

FIG. 4 is a block diagram 400 illustrating one embodiment of the invention. Block 402 represents panel-based measurement information from each of multiple entities. Block 404 represents audience-based measurement information from each of multiple entities. The information 402, 404 is stored in a database 406 as aggregated information. Block 408 represents the aggregated information, which can include manipulated stored information.

Block 410 represents distribution to, and use by, individual information-providing entities, of the aggregated information. In some embodiments, the aggregated information may be manipulated in any of various ways before being distributed to the information-providing entities.

Block 412 represents use of the aggregated information in developing of a standard for use in audience-related measurement, measurement techniques, measurement formatting, or measurement procedures. Various other uses, as well, may be made of the aggregated information.

Figure 5:
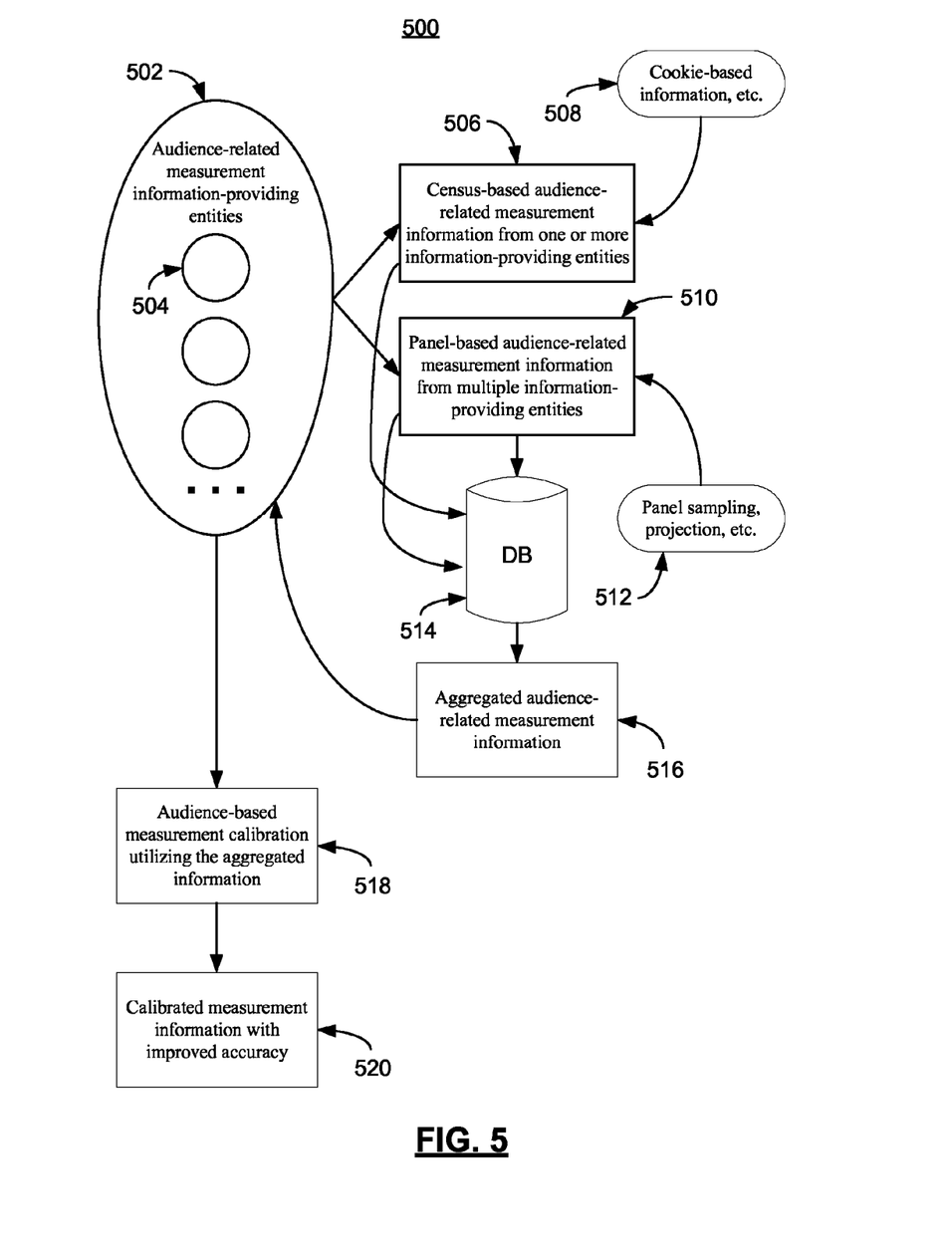
FIG. 5 is a block diagram illustrating one embodiment of the invention.

FIG. 5 is a block diagram 500 illustrating one embodiment of the invention. Oval 502 represents multiple audience-related measurement information-providing entities, represented by circles 504. Block 506 represents census-based audience-related measurement information from multiple information-providing entities, including cookie-based information 508. Block 510 represents panel-based audience-related measurement information from multiple information-providing entities, including panel sampling and projection information 512.

The information from the information-providing entities is stored in a database 514.

Block 516 represents aggregated audience-related measurement information obtained or derived from measurement information from or of the database 514.

Following the audience-related measurement information-providing entities obtaining the aggregated audience-related measurement information 516, block 518 represents audience-based measurement calibration utilizing the aggregated information, such as by one or more of the information-providing entities. Block 520 represents calibrated measurement information with improved accuracy, such as may be produced utilizing calibration as represented by block 518. In some embodiments, the depicted process may be cyclic, so that, in a future cycle, the calibrated or better-calibrated information is then provided to the database, etc., repeatedly improving or optimizing calibration or accuracy, etc.

Some embodiments of the invention are used with or in various forms of audience-related measurement. This can include online audiences, or other types of audiences and forms of online or offline media, such as television, radio, print, etc. Some embodiments are used in connection with advertising or advertising entities, but some embodiments relate to media or content, for example, without connection to advertising. Furthermore, audience-related measurement information can include information relating to an audience of a single entity, such as a publisher, etc., audiences of multiple entities, a portion or subset of an audience of a single entity or multiple entities, an audience associated with one or more properties of one or more entities, and overlapping audiences or audience portions, among other things.

Some embodiments can be used in various types of audience-related measurements. In some ways, each of various sources or entities providing measurement information can be viewed as analogous to individual musicians. Each can be viewed as having its own "instrument" or techniques that it uses in connection with audience-related measurement, in terms of various aspects that can include information collection, sampling, interpretation, calibration, projections, etc. However, just as musical instruments require tuning to perform more optimally, so in a sense do the "instruments" of individual measurement sources or entities. Some embodiments of the invention can be viewed as providing a tuning sound, or basis, by which individual measurement providers can calibrate their instruments, improving precision and accuracy. Generally, more, as well as more varied, information leads to better and more accurate conclusions or results, and so, in some embodiments, collective, aggregated measurement information from multiple providers allows for an excellent tuning mechanism.

In some embodiments, individual vendors and information-providing entities are encouraged to participate at least in part in order to receive and benefit from the aggregated information, and non-participating entities may not be allowed access to, or be provided with, the information. Additionally, information-providing entities may also be encouraged to participate in order to be perceived as a cooperative and productive member of the community of information-providing entities. Furthermore, as a flip side to that, information-providing entities may be discouraged from participating for fear of being ostracized or perceived badly for their lack of cooperation, or for fear that their measurement information will be considered inferior due to not benefiting from the aggregated measurement information, or both. These factors can produce a situation that results in wide participation, leading to effective results. All of this may be especially significant since many of the involved entities may be competitors, and as such would otherwise perhaps be unwilling to share information.

In some embodiments, privacy or anonymity of information-providing entities is protected or preserved, or in part or to a certain measure protected or preserved, thus further encouraging their participation. Still further, in some embodiments, aggregated information may be used in developing a standard, such as an open standard, providing yet another incentive for participation and benefit from the results.

In some embodiments, a multisided mechanism of a potentially unlimited number of participants, which can be called an n-sided open mechanism, is proposed for delivering hybrid estimation from multiple panel-side and network-side data, leading to, among other things, efficiency in marketplace transactions. While some embodiments are utilized outside an advertising context, some embodiments are utilized in the context of expanded applications in online advertising. Utility in advertising contexts may be due in part to the frequent importance of reach-based exposure metrics, where, for example, estimating the number of unique users exposed to a campaign, or served by a website may be an important aspect of media planning or marketing, and be associated with optimizing revenue.

Some embodiments may include a recognition that panel-only measurements may be accurate, such as on the number of users, but the projections they apply may suffer from a lack of alignment with the population being projected, such as an audience of a Web property, advertising network or advertising campaign, for example. However, panel-based measurement vendors may have a place in the marketplace due to their independent and neutral position.

Network measurements may benefit, for example, from full knowledge of the entire audience network served, but may suffer from certain deficiencies, such as operating primarily on cookies and not unique users, for example.

Hybrid methods are gaining importance, in some cases motivated in part by the potential misrepresentation of audience networks by the panel-based measurement vendors, among other things.

Of course, data-sharing can be a concern. In some embodiments, multisided hybrid mechanisms are provided, providing benefits which may include, for example, helping maintain a balance of power and incentive alignment for all entities to cooperate and deliver meaningful measurements to, for example, online advertising customers or other customers.

In some embodiments, in an n-sided marketplace, standard data fields and data sets may be shared periodically in an open format for measurement vendors to process. The results may be submitted and published jointly for the industry to see. By participating in this mechanism, the data and methodology of various entities may be kept private.

In some embodiments, it may be recognized that any partner that is serious and committed to improving measurement accuracy, such as of unique users, page views or advertisement views, may have very little reason to not participate in the open process, and participation may prove commitment. Ones that do may be rewarded, for example, with feedback on the extent of selection bias in their panel, and selecting better representative panels, or, for networks, by computing the unique users, such as from a bag of cookies, more efficiently.

In some embodiments, advertising customers may benefit, for example, from more accurate reporting on audience measurements to help them discover, plan, buy, verify delivery, and analyze performance for their online advertising.

In some embodiments, panel-based measurement vendors may gain relevant calibration signals to improve their projection weights and scaling factors, for example. Networks may obtain feedback to improve their research efforts in estimating unique users, for example.

In some embodiments, multiple entities focusing jointly in a standardized process can create a more open and trusted context for collaboration and reporting.

While the invention is described with reference to the above drawings, the drawings are intended to be illustrative, and the invention contemplates other embodiments within the spirit of the invention.

The invention claimed is:

1. A system comprising:
one or more processors; and
one or more databases capable of being coupled to the one or more processors;
wherein the one or more databases are configured for:
storing aggregated audience-related measurement information comprising:
panel-based audience-related measurement information, obtained from one or more panel-based information-providing entities, and
census-based audience-related measurement information, obtained from one or more census-based information-providing entities; and
storing one or more audience-based measurement calibrations, wherein the audience-based measurement calibrations are generated as a result of providing the aggregated audience-related measurement information to each of the panel-based information-providing entities and each of the census-based information-providing entities.

2. The system of claim 1, wherein the aggregated audience-related measurement information comprises an aggregation and integration of at least the panel-based audience-related measurement information from each of the panel-based information-providing entities.

3. The system of claim 1, wherein the aggregated audience-related measurement information comprises an aggregation and integration of at least the census-based audience-related measurement information from each of the census-based information-providing entities.

4. The system of claim 1, wherein the audience-based measurement calibrations comprise improvements derived from at least measurement precision and accuracy of the aggregated audience-related measurement information.

5. The system of claim 1, wherein the aggregated audience-related measurement information comprises hybrid estimations derived from manipulating, aggregating, integrating, combining, or reorganizing the panel-based audience-related measurement information and the census-based audience-related measurement information.

6. The system of claim 5, wherein the audience-based measurement calibrations comprise improvements to at least measurement precision and accuracy of the hybrid estimations.

7. The system of claim 1, further configured for:
storing a set of calibrated measurement information in the database, wherein the set of calibrated measurement information is derived from utilizing at least the audience-based measurement calibrations.

8. The system of claim 7, further configured for:
(A) updating the audience-based measurement calibrations, wherein updating the audience-based measurement calibrations is a result of providing the set of calibrated measurement information to each of the panel-based information-providing entities and each of the census-based information-providing entities;
(B) updating the set of calibrated measurement information, wherein updating the set of calibrated measurement information is a result of utilizing the updated audience-based measurement calibrations; and
(C) storing a prescribed calibration threshold, wherein the prescribed calibration threshold is utilized in updating the audience-based measurement calibrations and the set of calibrated measurement information until the prescribed calibration threshold is exceeded.

9. The system of claim 8, wherein the prescribed calibration threshold is determined in part by a minimum degree of modification for updating the audience-based measurement calibrations.

10. A method using one or more computers, the method comprising:
obtaining a first set of information comprising:
panel-based audience-related measurement information from each of one or more panel-based information-providing entities; and
census-based audience-related measurement information from each of one or more census-based information-providing entities;
storing the first set of information in a database;
generating an aggregated audience-related measurement information derived from each of the panel-based and census-based information-providing entities;
providing the aggregated audience-related measurement information to each of the panel-based and census-based information-providing entities; and
generating, based in part on providing the aggregated audience-related measurement information, one or more audience-based measurement calibrations.

11. The method of claim 10, wherein the aggregated audience-related measurement information comprises an aggregation and integration of at least the panel-based audience-related measurement information from each of the panel-based information-providing entities.

12. The method of claim 10, wherein the aggregated audience-related measurement information comprises an aggregation and integration of at least the census-based audience-related measurement information from each of the census-based information-providing entities.

13. The method of claim 10, wherein generating the audience-based measurement calibrations comprises utilizing the aggregated audience-related measurement information to improve at least measurement precision and accuracy of the first set of information obtained from each of the panel-based and census-based information-providing entities.

14. The method of claim 10, wherein the aggregated audience-related measurement information comprises hybrid estimations derived from manipulating, aggregating, integrating, combining, or reorganizing the first set of information obtained from each of the panel-based and census-based information-providing entities.

15. The method of claim 14, wherein generating the audience-based measurement calibrations comprises utilizing the hybrid estimations to improve at least measurement precision and accuracy of the first set of information obtained from each of the panel-based and census-based information-providing entities.

16. The method of claim 10, further comprising:
utilizing at least the audience-based measurement calibrations to generate a set of calibrated measurement information; and
storing the set of calibrated measurement information in the database.

17. The method of claim 16, further comprising:
manipulating, aggregating, integrating, combining, or reorganizing the set of calibrated measurement information.

18. The method of claim 16, further comprising the steps:
(A) providing the set of calibrated measurement information to each of the panel-based and census-based information-providing entities;
(B) updating, based in part on providing the set of calibrated measurement information, the audience-based measurement calibrations;
(C) utilizing at least the updated audience-based measurement calibrations to update the set of calibrated measurement information; and
(D) if a prescribed calibration threshold has not been exceeded, iteratively repeating steps (A)-(C) until the prescribed calibration threshold is exceeded.

19. The method of claim 18, wherein the prescribed calibration threshold is determined in part by a minimum degree of modification for updating the audience-based measurement calibrations.

20. A non-transitory computer readable medium or media containing instructions for executing a method using one or more computers, the method comprising:
obtaining a first set of information comprising:
panel-based audience-related measurement information from each of one or more panel-based information-providing entities; and
census-based audience-related measurement information from each of one or more census-based information-providing entities;
using one or more computers, storing the first set of information in a database;
using one or more computers, generating an aggregated audience-related measurement information derived from each of the panel-based and census-based information-providing entities;
providing the aggregated audience-related measurement information to each of the panel-based and census-based information-providing entities;
generating, based in part on providing the aggregated audience-related measurement information, one or more audience-based measurement calibrations;

utilizing at least the audience-based measurement calibrations to generate a set of calibrated measurement information;

constructing an open standard and an open mechanism from manipulating, aggregating, integrating, combining, or reorganizing the set of calibrated measurement information; and providing the open standard and the open mechanism to at least one of the panel-based information-providing entities and at least one of the census-based information-providing entities, for use in connection with advertising or advertising-related applications.

\* \* \* \* \*